Feb. 16, 1965     R. C. SPARLING ETAL     3,169,398

MAGNETIC DRIVE FOR FLUID FLOW METERS

Filed Dec. 21, 1961

RAY C. SPARLING,
JOSEPH A. BRAUN,
INVENTORS.

BY

ATTORNEYS.

United States Patent Office 3,169,398
Patented Feb. 16, 1965

3,169,398
MAGNETIC DRIVE FOR FLUID FLOW METERS
Ray C. Sparling, San Gabriel, and Joseph A. Braun, Temple City, Calif., assignors to Hersey-Sparling Meter Company, El Monte, Calif., a corporation of Massachusetts
Filed Dec. 21, 1961, Ser. No. 161,179
6 Claims. (Cl. 73—231)

The present invention relates generally to fluid flow meters, for example the type used to measure the rate of flow of a liquid through a conduit; and more especially to an advantageous magnetic drive whereby the motion of the impeller in response to movement of the liquid is transmitted to the register or recording part of the meter.

Ordinarily, recording meters of this type include a rotatively mounted impeller member attached to a first shaft mounted in bearings within a housing, all of which is immersed in the moving stream of liquid, typically water. The meter register is mounted externally of the liquid stream where it can be observed and readings made of the recorded flow. Between the register and the impeller is a drive which is designed to transmit motion from the impeller to the meter register to drive the latter.

Typically, the meter includes a second shaft with its axis disposed at an angle to the axis of the first shaft and which passes through a wall of the conduit or other physical structure which confines the liquid stream or isolates it from the drive shaft. According to known practice, a driving connection between the two shafts is effected by means of gears, usually a worm and pinion or a pair of bevel gears. This arrangement allows the register or other recording device to be outside the liquid stream but the gears generally are in the liquid stream. In typical constructions which have come to applicants' attention, the second shaft is provided with packing of any suitable type designed to prevent leakage of water or other liquid from the conduit around the rotating shaft where it passes through the conduit wall or where it passes through any other members which confines the liquid stream or excludes it from contact with at least a part of the rotating shaft.

With this construction various conflicting requirements are encountered. The packing should fit tightly against the rotating shaft in order to prevent leakage; and this is especially true if the liquid in the conduit is under high pressure. On the other hand, the frictional engagement of the packing with the shaft consumes part of the power from the impeller and also makes necessary the application of a certain minimum torque to turn the shaft. Particularly at low rates of flow, this friction loss and the necessity for a minimum force to turn the shaft can well be sources of material error in the meter reading since they have the effect of reducing the responsiveness of the meter to the impeller. This is a particularly objectionable condition since it does not produce a constant loss in the drive, varying both with speed and wear in the unit, and cannot be compensated for.

Another very important difficulty with the prior construction described is that the gears are immersed in the liquid stream. In irrigation systems for example the stream of water often carries sand or other foreign matter that causes the gears to wear rapidly. This wear ultimately causes the meter to fail. The cost of inspection, maintenance and replacement of the gears is high and is a direct result of exposure of the gears to abrasive material in the liquid stream.

It thus becomes a general object of our invention to provide a novel type of drive for a liquid flow meter or the like which eliminates the friction losses and consequent problems caused by the packing around the drive shaft and thus reduces to a minimum the torque necessary to rotate the drive shaft to the register.

Another object of the invention is to effect a driving connection between driving and driven elements of the meter drive in such a way that no moving seal is necessary in the wall of a conduit or other member for the drive where it passes through the wall or other member, thus eliminating the need for packing which is subject to wear, needs replacement, and offers a possibility of leaking if not properly maintained.

A further object is to eliminate any gears in a drive from the impeller to the register and to drivingly connect two shafts at an angle to each other by means not subject to wear.

These and other objects of our invention are achieved by providing in a liquid flow meter a drive comprising a first shaft rotatively mounted by suitable means within a moving stream or body of liquid, impeller means on said shaft and exposed to said liquid stream to rotate the shaft in response to movement of the liquid, and a permanent magnet mounted on the shaft to be rotated thereby. A second shaft is rotatively mounted with its axis at an angle to the axis of the first shaft, normally at 90° thereto, the second shaft being adapted for a driving connection to the meter register which is located externally of the liquid stream or at any other suitable position. A second permanent magnet is mounted on the second shaft to rotate therewith, the two magnets being each within the magnetic field of the other so that they are magnetically coupled together whereby rotation of the first magnet causes corresponding rotation of the second magnet and the associated shaft to drive the meter.

Each of these magnets comprises a plurality of pole pieces arranged in an annular row concentric with the axis of rotation of the magnet. In the preferred embodiment illustrated, the outer faces of the pole pieces are beveled so that the faces of the pole pieces lie in a frusto-conical surface of revolution on each magnet. These frusto-conical surfaces of the two magnets are preferably arranged to be substantially parallel to each other at their point of closest approach but are spaced apart a short distance in order to permit non-magnetic wall means to be interposed between the magnets, which wall means isolates the second shaft and the magnet thereon from the liquid stream. The magnetic field between the magnets passes through the non-magnetic wall member so that driving torque is transmitted from one magnet to the other through a solid impervious member, thus eliminating the need for any moving fluid-tight seal to receive the drive shaft and also eliminating friction at such seal.

Although described as a flow meter for liquids the present invention may be used as a flow meter for gaseous fluids since the nature of the fluid is not limiting on the invention.

How the above objects and advantages of our invention, as well as others not specifically referred to herein, are achieved will be more readily understood by reference to the following description and the annexed drawing, in which.

Figure 1:
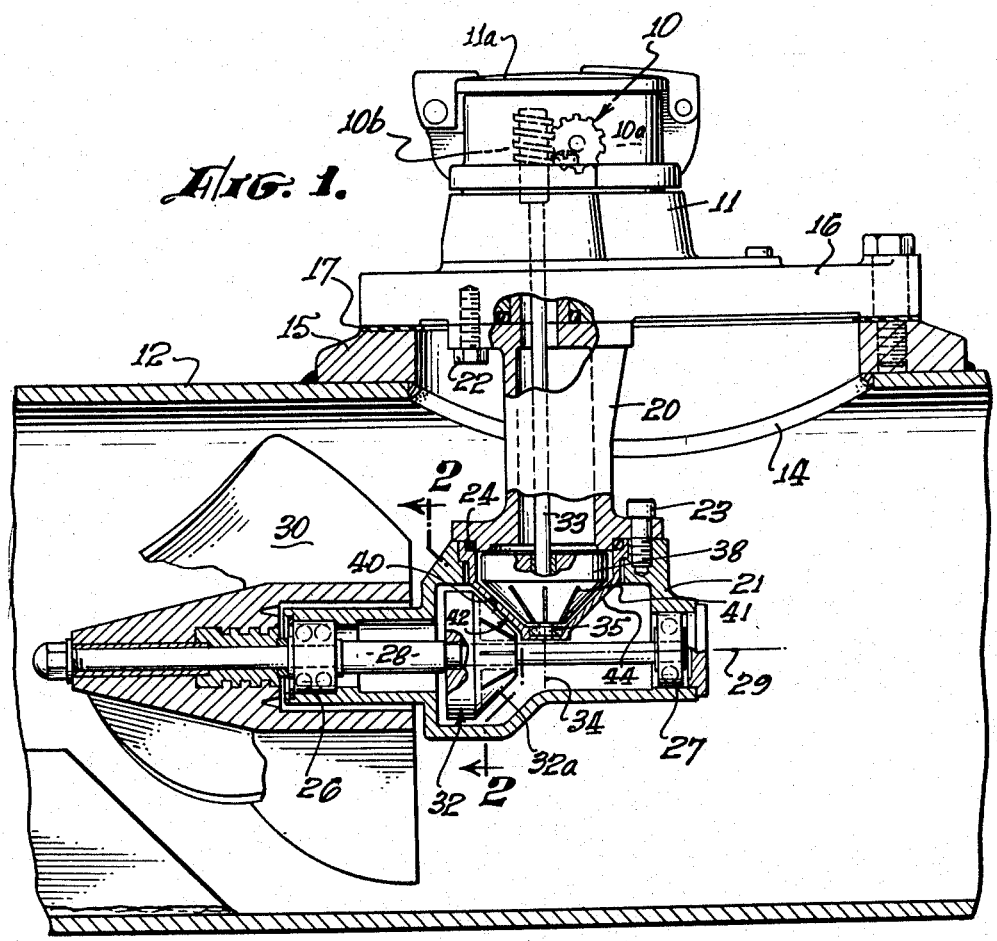
FIG. 1 is a combined side elevation and vertical median section of a liquid flow meter embodying the invention in a magnetic drive adapted to drive a register or recording device.
Figure 2:
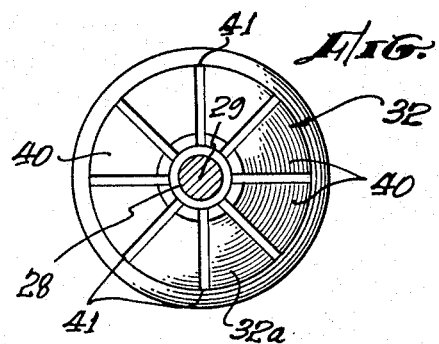
FIG. 2 is a section on line 2—2 of FIG. 1 showing the driving magnet in end elevation.

Referring now to the drawing, there is shown in FIGS. 1 and 2 a liquid flow meter embodying a preferred form of the invention. The drive mechanism of the meter is adapted to drive a register indicated generally at 10 and located externally of the wall of conduit 12 through which flows a stream of water or other liquid. The register is enclosed within housing 11 and is visible upon lifting hinged cover 11a. The register is not shown in detail since it may be of any type known in the art. This device is often termed a counter or totalizer and records the total quantity of liquid, usually in cubic feet, passing the meter. The type of register is immaterial from the standpoint of the present invention, since the drive may be connected to any suitable register which is actuated by a rotating shaft. The mechanism here shown is of the type that includes a plurality of co-axial recording drums 10a driven through a suitable gear train 10b. Likewise the pipe 12 constitutes no necessary part of the present invention but is merely typical of the environment in which the meter drive finds its advantages most fully utilized because the problems which it solves are encountered most acutely when the meter is measuring flow of a liquid under pressure, as is the normal case with water flowing through pipe 12. However it will be understood that the drive may be used with a stream of liquid in an open conduit, such as water flowing in an open ditch.

Conduit 12 has an opening 14 in one side, which is normally the upper side assuming that the axis of the pipe is horizontal. Surrounding opening 14 is a mounting ring 15 attached to the wall of the pipe by welding or in any other suitable manner. Mounting ring 15 provides a base upon which cover plate 16 can be securely mounted, a water tight seal being achieved by interposing gasket 17 between the mounting ring and the cover plate. The register 10 is mounted on the outside of the cover plate, normally at the top side of the pipe where it is readily accessible for reading. Depending from the under side of cover plate 16 is a housing which provides a support structure for the moving parts hereinafter described and which is preferably formed in two principal sections 20 and 21 for ease of access to the interior of the housing. The housing section 20 is bolted by bolts 22 or other suitable means to the underside of cover plate 16 and carries at its lower end the other housing section 21, the two housing sections being fastened together by bolts 23 or other suitable means. An O-ring or the like at 24 provides a fluid tight seal between the two housing sections.

Inside lower housing section 21 are two bearings 26 and 27 in which shaft 28 is rotatively mounted. The axis 29 of the shaft is typically, but not necessarily, horizontal, or generally so, and is therefore illustrated in this position but without any limitation thereto being implied. However axis 29 is ordinarily parallel to or coincident with the axis of conduit 12, especially if a closed pipe, and is parallel to the direction of stream flow. On one end of shaft 28 projecting upstream from housing 21 is impeller 30. Impeller 30 is immersed in the stream of liquid flowing through pipe 12 and is rotated by the movement of the liquid at a speed which is a known function of the velocity of the moving liquid. The impeller may have any suitable design for this purpose and is attached to shaft 28 in such a way as to rotate the shaft with the impeller. Bearings 26 and 27 in the interior of housing section 21 may or may not be provided with packing or other means to isolate them from the surrounding liquid.

Also attached to shaft 28 to rotate therewith is a first magnet 32. This magnet is of the permanent type and may be made from any suitable ferro-magnetic material. Alloys high in nickel and cobalt and commonly marketed under the tradename "Alnico" and also ceramic magnets marketed under the tradename "Indox" are suitable for this purpose.

Extending vertically through the interior of housing section 20 is a second shaft 33 which is mounted by and within the housing to rotate about axis 34, the latter axis being typically vertical and therefore disposed at an angle to axis 29. Axes 29 and 34 are preferably co-planar and at 90° to each other for practical reasons; but the invention is not necessarily limited to these relationships.

The magnets can be shaped to accommodate a substantial range of angles between the axes of shafts 28 and 33 as well as to accommodate some offset between axes. The shaft 33 may be rotatably mounted in any suitable bearings, which may include thrust bearing 35 at the lower end of the shaft. Shaft 33 extends through cover plate 16 and into the housing of meter 10 for connection with the register mechanism. At the lower end of shaft 33 is a second permanent magnet 38, constructed similarly to magnet 32 and mounted upon shaft 33 in any suitable manner to rotate therewith.

As may be seen by reference to FIG. 2, permanent magnet 32 is of generally circular configuration when viewed axially. It comprises a plurality of pole pieces 40 arranged in an annular row concentric with axis 29, which is the axis of rotation of magnet 32. A satisfactory and convenient number of pole pieces is eight although this number may be increased or decreased within limits. Each two successive pole pieces 40 are illustrated as separated by a slot 41 creating an air gap between two successive unlike poles. This is typical of metal magnets but ceramic magnets can be made without these slots. Centrally of the magnet, the pole pieces are separated diametrically by the bore or space through which shaft 28 passes.

In FIG. 1 it will be seen that the circumferential faces of the pole pieces are in part beveled so that peripheral faces of the poles lie in a frusto-conical surface 32a which is a surface of revolution concentric with axis 29. The included central angle of the frusto-conical surface is in this case equal to the angle between axes 29 and 34, which is 90°. The other permanent magnet 38 is constructed in the same way and has the same number of poles as magnet 32. Under these circumstances both magnets have the same shape and the central angle of the conical portion is the same for both magnets. If the angle between axes 29 and 34 is changed so that axis 34 is no longer normal to axis 29, then the two magnets still may have equal central angles of the conical portions. However this relationship of the disposition and shape of the magnets is not limitative upon the present invention since arrangements are possible in which the two magnets do not have equal angles for their conical surfaces.

From FIG. 1 it is seen that the two magnets are so disposed that the frusto-conical surfaces on the two magnets are substantially parallel to each other at the point of closest approach. Parallelism, or substantially so, at this point is desired in order to have the maximum magnetic linkage between the two magnets since it is near this point of closest approach that each magnet is most effective within the magnetic field of the other magnet to establish a magnetic linkage or coupling between opposing pole faces on the two magnets.

A particular feature of the invention is the presence of means isolating the driven elements, magnet 38 and shaft 33, from the stream of liquid in pipe 12, said means including a non-magnetic wall 42 interposed between the two magnets. Non-magnetic wall member 42 passes between the two magnets at the point of their closest approach so that the magnetic field coupling the two magnets passes through this non-magnetic wall. In the present construction, wall 42 is provided by a cup-like member 44 supported by housing section 21. The O-ring seal 24 provides a liquid-tight joint between the flange of cup 44 and upper housing section 20. The bottom of the cup member 44 supports thrust bearing 35. The upper housing section 20 enclosing shaft 33 has its lower end closed against the liquid by cup 44 in which the driven magnet is located. Thus housing section 20 and cup 44 together form means enclosing and isolating the driven elements from the liquid stream and also separating them from the driving elements, shaft 28 and magnet 32, which may thus be exposed more or less to the liquid stream. However in a broad aspect of the invention, the wall 42 may take any suitable shape that is satisfactory to effect a continuous wall defining separate chambers within the housing containing respectively magnets 32 and 38 so that the magnet 38 and its associated shaft 33 are completely isolated by wall member 42, which is impervious to fluid, from any fluid in conduit 12 and, more especially, within housing section 21.

The magnetic field existing between the two magnets passes through the wall member 42 and couples the two magnets together so that rotation of magnet 32 in response to movement of impeller 30 causes a corresponding rotational movement of the second magnet 38, which motion is transmitted by drive shaft 33 to the register 10 of the meter. This driving torque is imparted to shaft 33 without the necessity of using gears of any type to transmit torque from the driving shaft 28 to the driven shaft 33. Accordingly wear of the gears or any other contacting elements is eliminated along with the attendant problems of maintenance and replacement of the gears. Likewise there is no necessity of piercing any wall confining the liquid stream or exposed to it with an opening through which drive shaft 33 passes. Shaft 33 is not at any point exposed to the liquid in the conduit but is always isolated from the liquid by housing 20 and member 42. Thus there is eliminated the need for packing around a revolving shaft to provide a fluid tight seal in a wall confining the liquid stream, as in known designs. Elimination of frictional engagement of driven shaft 33 with a packing around the shaft eliminates the attendant friction and enables the shaft to be driven with a minimum torque. Likewise elimination of the packing at a drive shaft reduces the friction opposing revolution of shaft 28 with the result that the speed of revolution of the shaft is at all times accurately proportional to the flow of liquid which is causing rotational movement of impeller 30.

Other advantages achieved by the arrangement of the present invention involve freedom from leakage at the packing and elimination of any maintenance of the packing in order to prevent leakage of liquid under high pressure in contact with one side of the packing.

While the preferred embodiment of the invention disclosed above has two magnets each with an equal number of magnetic poles, thereby producing equal rotational speeds of shafts 28 and 33, it is within the scope of the invention to provide different numbers of poles on the two magnets. This can be done within limits and thus drive the driven shaft 33 with some ratio other than the 1:1 ratio of the present construction. For example an output speed ratio of 2:1 can be obtained by having twelve poles on magnet 32 and six poles on magnet 38.

From the foregoing description, it will be evident that many changes in the size, shape and arrangement of the components of the magnetic drive constituting the present invention may be made by persons skilled in the art without departing from the spirit and scope of the present invention. For example, it will be within the capability of one having ordinary skill in the art to modify the design to adapt the drive to gaseous fluids if desired. Accordingly it is to be understood that the foregoing description is considered to be illustrative of, rather than limitative upon, the invention as defined by the appended claims.

We claim:
1. A drive for a fluid flow meter or the like comprising:
   a support structure;
   a first shaft rotatably mounted by said support structure;
   impeller means on said shaft to rotate said shaft in response to movement in a body of fluid in contact with said impeller;
   a first magnet means mounted on the shaft to rotate therewith;
   a second shaft rotatably mounted by said support structure at an angle to the first shaft and adapted for driving connection to a register of the meter;
   and a second magnet means mounted on the second shaft to rotate therewith, the second magnet means being magnetically coupled to the first magnet means whereby rotation of the first magnet means causes rotation of the second magnet means and the associated shaft;
   each of said magnet means comprising a permanent magnet having beveled pole faces lying in a frusto-conical surface.

2. A drive as defined in claim 1 in which the two shafts have their axes disposed at substantially 90° to each other.

3. A drive for a fluid flow meter or the like comprising:
   a support structure;
   a first shaft rotatably mounted by said support structure;
   impeller means on said shaft to rotate said shaft in response to movement in a body of fluid in contact with said impeller;
   a first magnet means mounted on the shaft to rotate therewith;
   a second shaft rotatably mounted by said support structure at an angle to the first shaft and adapted for driving connection to a register of the meter;
   a second magnet means mounted on the second shaft to rotate therewith, the second magnet means being magentically coupled to the first magnet means whereby rotation of the first magnet means causes rotation of the second magnet means and the associated shaft;
   each of said magnet means comprising a permanent magnet having beveled pole faces lying in a frusto-conical surface;
   and means comprising a non-magnetic wall member interposed between the two magnet means isolating the second shaft and the magnet means thereon from the fluid body, the magnetic field between the magnet means passing through said non-magnetic wall member.

4. A drive for a fluid flow meter or the like comprising:
   a support structure;
   a first shaft rotatably mounted by said support structure;
   impeller means on said shaft to rotate said shaft in response to movement of a body of fluid in contact with the impeller;
   a permanent magnet attached to said shaft to rotate therewith;
   a second shaft rotatably mounted by said support structure at an angle to the first shaft and adapted for a driving connection to a register of the flow meter;
   and a second permanent magnet mounted on the second shaft to rotate therewith;
   each of said magnets comprising a plurality of pole pieces arranged in an annular row concentric with the axis of the associated shaft and separated by an air gap, each magnet having the pole pieces thereof beveled to dispose faces of the pole in a frusto-conical surface;
   the two magnets being disposed to bring the frusto-conical surfaces thereof into proximity to each other and substantially parallel to each other at the point of closest approach, whereby the magnets are coupled to each other and rotation of one magnet causes rotation of the other magnet.

5. A drive for a fluid flow meter or the like, comprising:
   a support structure;
   a first shaft rotatably mounted by said support structure;
   impeller means on said shaft and exposed to a body of fluid to rotate said shaft in response to movement of said body of fluid;
   a permanent magnet attached to the shaft to rotate therewith;
   a second shaft rotatably mounted by said support structure at an angle to the first shaft and adapted for a driving connection to a flow meter;

and a second permanent magnet mounted on the second shaft to rotate therewith;

each of said magnets being of frusto-conical shape and comprising a plurality of pole pieces arranged in an annular row concentric with the axis of the associated shaft;

and means including a frusto-conical non-magnetic member interposed between the two magnets isolating the second shaft and the magnet thereon from the fluid body, the magnetic field between the magnets passing through said non-magnetic member and magnetically coupling the magnets for simultaneous rotation.

6. A drive as defined in claim 5 in which the two shafts have their axes disposed at substantially a right angle to each other.

References Cited in the file of this patent
UNITED STATES PATENTS

| | | |
|---|---|---|
| 2,722,617 | McCluwen et al. | Nov. 1, 1955 |
| 2,770,131 | Sparling | Nov. 13, 1956 |